United States Patent [19]
Kish et al.

[11] Patent Number: 5,890,176
[45] Date of Patent: Mar. 30, 1999

[54] OBJECT-ORIENTED DOCUMENT VERSION TRACKING METHOD AND APPARATUS

[75] Inventors: John W. Kish, Roswell; David A. Wittler, Alpharetta; Daniel F. Burkes, Atlanta, all of Ga.

[73] Assignee: International Business Machines Corp., Armonk, N.Y.

[21] Appl. No.: 638,904

[22] Filed: Apr. 24, 1996

[51] Int. Cl.⁶ .................................................. G06F 17/30
[52] U.S. Cl. ............................................ 707/511; 707/203
[58] Field of Search ................................. 707/500, 511, 707/514, 515, 530, 203

[56] References Cited

U.S. PATENT DOCUMENTS

| | | | |
|---|---|---|---|
| 3,623,661 | 11/1971 | Hon | 707/1 |
| 4,912,637 | 3/1990 | Sheedy et al. | 707/203 |
| 5,150,458 | 9/1992 | Masuzaki et al. | 345/435 |
| 5,280,583 | 1/1994 | Nakayama et al. | 395/200.35 |
| 5,339,389 | 8/1994 | Bates et al. | 345/331 |
| 5,438,661 | 8/1995 | Ogawa | 345/346 |
| 5,537,529 | 7/1996 | Borovoy et al. | 707/511 |
| 5,553,216 | 9/1996 | Yoshioka et al. | 707/515 |
| 5,574,898 | 11/1996 | Leblang et al. | 707/1 |
| 5,638,504 | 6/1997 | Scott et al. | 707/530 |
| 5,649,200 | 7/1997 | Leblang et al. | 395/703 |
| 5,671,428 | 9/1997 | Muranaga et al. | 707/511 |

*Primary Examiner*—Joseph R. Burwell
*Attorney, Agent, or Firm*—Kudkirka & Jobse, LLP

[57] ABSTRACT

A single file holds multiple versions of a document composed of an interconnection of objects which themselves have versions and are stored in the file. When the document is changed by changing any of the interconnected objects, a check is first made to determine whether the object version is same as the document version currently being edited. If not, a copy of the object is made and saved. Any version of the document can be reconstructed by interconnecting object versions which have a highest level which is equal to, or less than, the desired document version. Therefore, only objects which are changed are duplicated and copies of objects are only made when an object changes. The interconnection of the objects to form structure of the document is maintained by an interconnection of object pointers. Each object has an associated demand loader object which includes a list of object versions for the associated object plus a pointer to one of the versions. The demand loader object also includes methods for loading the associated object into memory from storage when the object is accessed. In this manner, the whole document does not have to be loaded in order to be accessible.

23 Claims, 8 Drawing Sheets

OBJECT-ORIENTED DOCUMENT VERSION TRACKING METHOD AND APPARATUS

COPENDING APPLICATIONS

This application is the one of four sibling patent applications filed on an even date herewith and commonly assigned, including U.S. patent application Ser. No. 08/638,908, entitled "METHOD AND APPARATUS FOR ORGANIZING A DOCUMENT USING HIERARCHICAL ARRANGEMENT OF OBJECTS", and U.S. patent application Ser. No. 08/638,992, entitled "METHOD AND APPARATUS FOR CONSOLIDATING EDITS MADE BY MULTIPLE EDITORS WORKING ON MULTIPLE DOCUMENT COPIES" and U.S. patent application Ser. No. 08/637,310, entitled "METHOD AND APPARATUS FOR DISPLAYING MODELESS BAR INTERFACES IN A COMPUTER SYSTEM". The subject matter of the above-identified copending patent applications is hereby incorporated by reference.

FIELD OF THE INVENTION

This invention relates to document editing and to editing systems which store document revisions, and, in particular, to a method and apparatus for minimizing storage space necessary to store multiple revision copies of a document.

BACKGROUND OF THE INVENTION

Word processing software has revolutionized the manner in which people generate documents and, in some cases has created whole industries such as the desktop publishing industry. However, when documents are created by more than one author, or are very large and complex, they often are revised many times before a final document is created. During the course of the document creation, when a new round of changes is being made, it is frequently desirable to maintain a complete copy or version of the document before the new revisions are made. The version copy may then be used as a comparison document with the current document to quickly locate the changes or may be used to reverse or "undo" the changes. Depending on the complexity of the document or the number of people involved in its creation, there may be multiple copies or versions of the document which must be stored.

Current word processing applications often lack the functionality necessary to efficiently organize and manage multiple document versions. In particular, it is increasingly desirable to include all version copies in a single master document, so that the copies can be stored, retrieved and distributed as a single entity. Although some word processing applications have provided facilities for maintaining multiple version copies, they generally do not allow a single file to include more than one version. Therefore, separate files need to be created for each version copy. The use of separate files has several disadvantages. First, a large amount of memory is consumed since the entire document must be stored and retrieved for each version. Secondly, the large amount of duplicate information, which must be manipulated due to the multiple versions, requires more processor time and therefore, slows the entire word processing system.

In order to overcome this latter difficulty, some systems only store copies for a predetermined number of the latest document versions or only load into memory the latest versions. However, with these latter systems, it is frequently not possible to keep a record of document changes since not all versions of the document are simultaneously available. In addition, in such system, since all changes are not available, some changes cannot be undone and redone.

Further, since separate copies of the versions must be maintained, there is an increased possibility of separating the copies and either losing some copies or failing to transmit the copies to editors or reviewers.

Accordingly, there is a need for a versioning tool which allows for the creation of a single master document containing all versions without duplicating the entire document for each version. More particularly, there is a need for word processing software which enables authors to create and revise documents and maintain copies of all previous revisions so that all changes can be undone and redone. There is a further need for a versioning tool which is compatible with an object-oriented word processing program.

SUMMARY OF THE INVENTION

The foregoing objects are achieved and the foregoing problems are overcome by one illustrative embodiment of the invention in which a single file holds multiple versions of a document. The document is composed of an interconnection of objects which themselves have versions and are stored in the file. When the document is changed by changing any of the interconnected objects, a check is first made to determine whether the object version is same as the document version currently being edited. If not, a copy of the object is made and saved. Any version of the document can be reconstructed by interconnecting object versions which have a highest level which is equal to, or less than, the desired document version. Therefore, only objects which are changed are duplicated and copies of objects are only made when an object changes.

In accordance with a preferred embodiment, the interconnection of the objects to form structure of the document is maintained by an interconnection of object pointers and demand loader objects. Each demand loader object includes a list of object versions for the associated object plus a pointer to one of the versions. The demand loader object also includes methods for loading the associated object into memory from storage when the object is accessed. In this manner, the whole document does not have to be loaded in order to be accessible.

BRIEF DESCRIPTION OF THE DRAWING

The above and other features, objects and advantages of the invention will be better understood by referring to the following detailed description in conjunction with the accompanying drawing in which.

DETAILED DESCRIPTION OF THE PREFERRED EMBODIMENT

Figure 1:
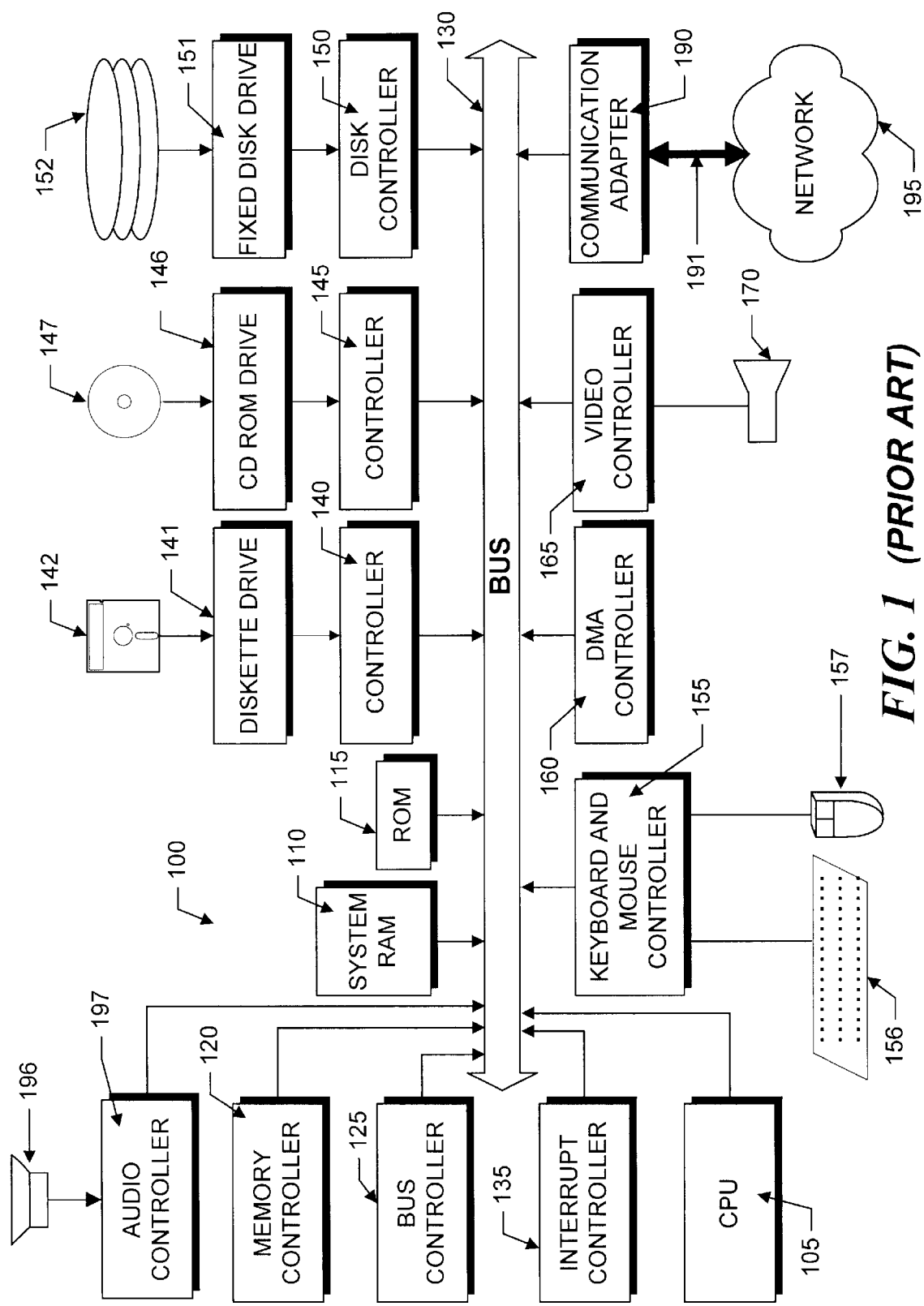
FIG. 1 is a block diagram of a computer system suitable for use with the present invention.

FIG. 1 illustrates the system architecture for a computer system 100 such as an IBM PS/21, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Non-volatile mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tablet may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among things. In particular, an operating system resident in system memory and running on CPU 105 coordinates the operation of the other elements of computer system 100. The present invention may be implemented with any number of commercially available operating systems including OS/2®, UNIX and DOS, etc.

Figure 2:
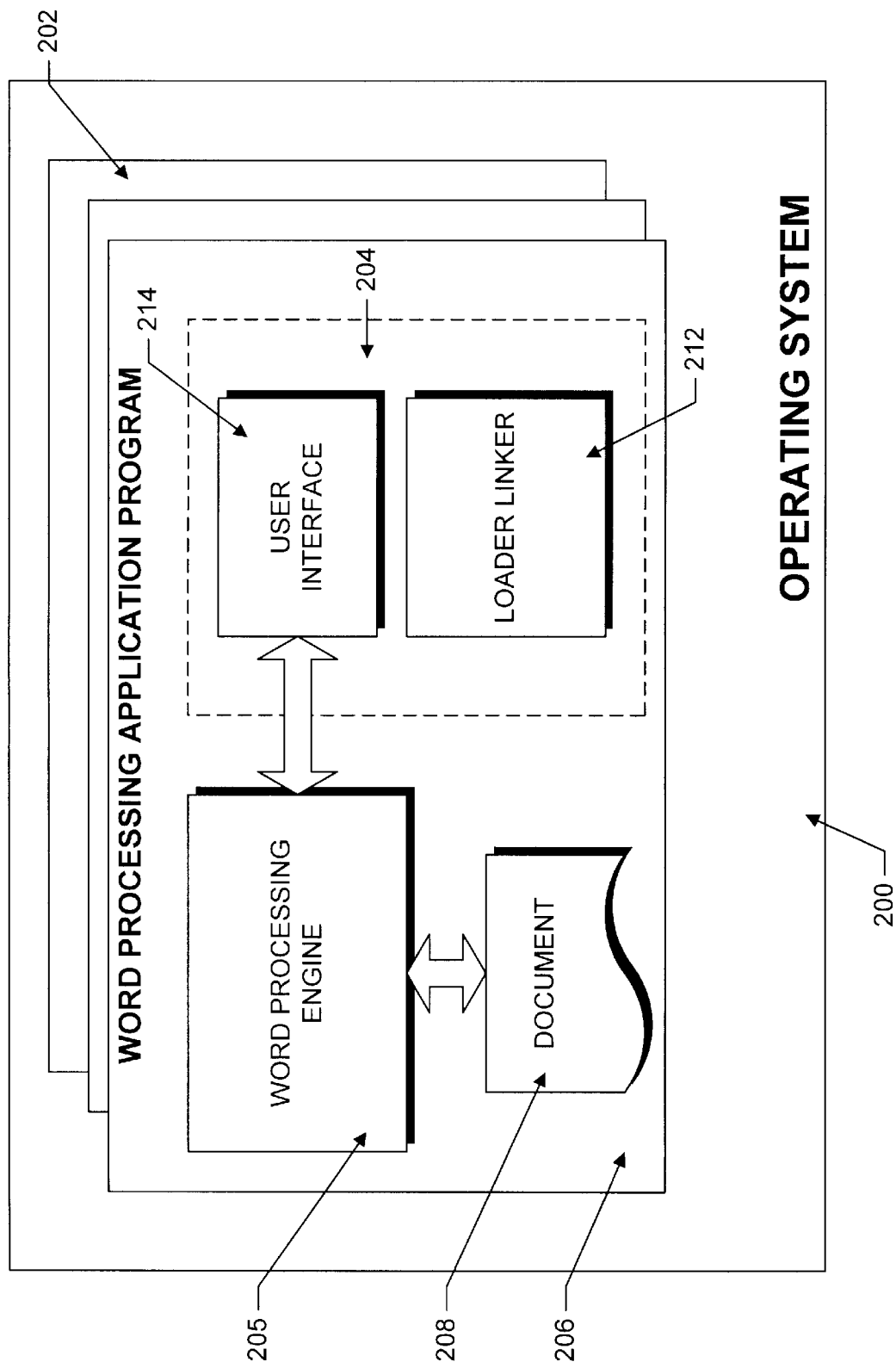
FIG. 2 is a schematic block diagram of the program elements comprising the inventive versioning tool.

FIG. 2 illustrates schematically illustrative software components including an illustrative word processing application program 206 constructed in accordance with the principles of this invention as well as other system components with which the word processing system interacts. In particular, an operating system 200 resident in system memory and running on CPU 105 coordinates the operation of the other elements of computer system 100. The present invention may be implemented with any number of commercially available operating systems including OS/2, UNIX and DOS, etc. One or more applications 202 such as word processors, editors, spread sheets, compilers, etc., execute in order to control the operating system 200. If operating system 200 is a true multitasking operating system, such as OS/2, multiple applications may execute simultaneously.

The inventive versioning system may be implemented as an integral part of a document authoring application, such as a word processor. In particular, a word processing application suitable for use with the present invention, and to which the description of the illustrative embodiment of the invention will be directed, is Lotus WordPro®, 96 Edition, commercially available from Lotus Development Corporation, Cambridge, Mass., a subsidiary of International Business Machines Corporation. In the illustrative embodiment, versioning tool 204 is integrated into a word processing application 206. Word processing application 206 further comprises, among other software modules, word processing engine 205, user interface 214 and a loader/linker 212.

The word processing engine 205 operates on a document 208 which is constructed in accordance with the principles of the invention and which is loaded from non-volatile storage into memory by means of the loader-linker 212. The structure of objects used to construct documents in the illustrative embodiment is described in detail with reference to FIG. 3.

In the illustrative embodiment, the word processing application program 206 may be implemented in an object-oriented programming language, such as C++, using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow. A similar process can be used to create polymorphic operators such as "=" or ">" by a process called "overloading" in which several definitions are created for each operator and an appropriate definition chosen at runtime.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these functions appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Accordingly, the data structures used to represent documents within application 206 are objects or groups of objects. In particular, a document, in accordance with the invention resides in system memory as a network of objects interconnected through object pointers, as explained hereinafter.

Figure 3:
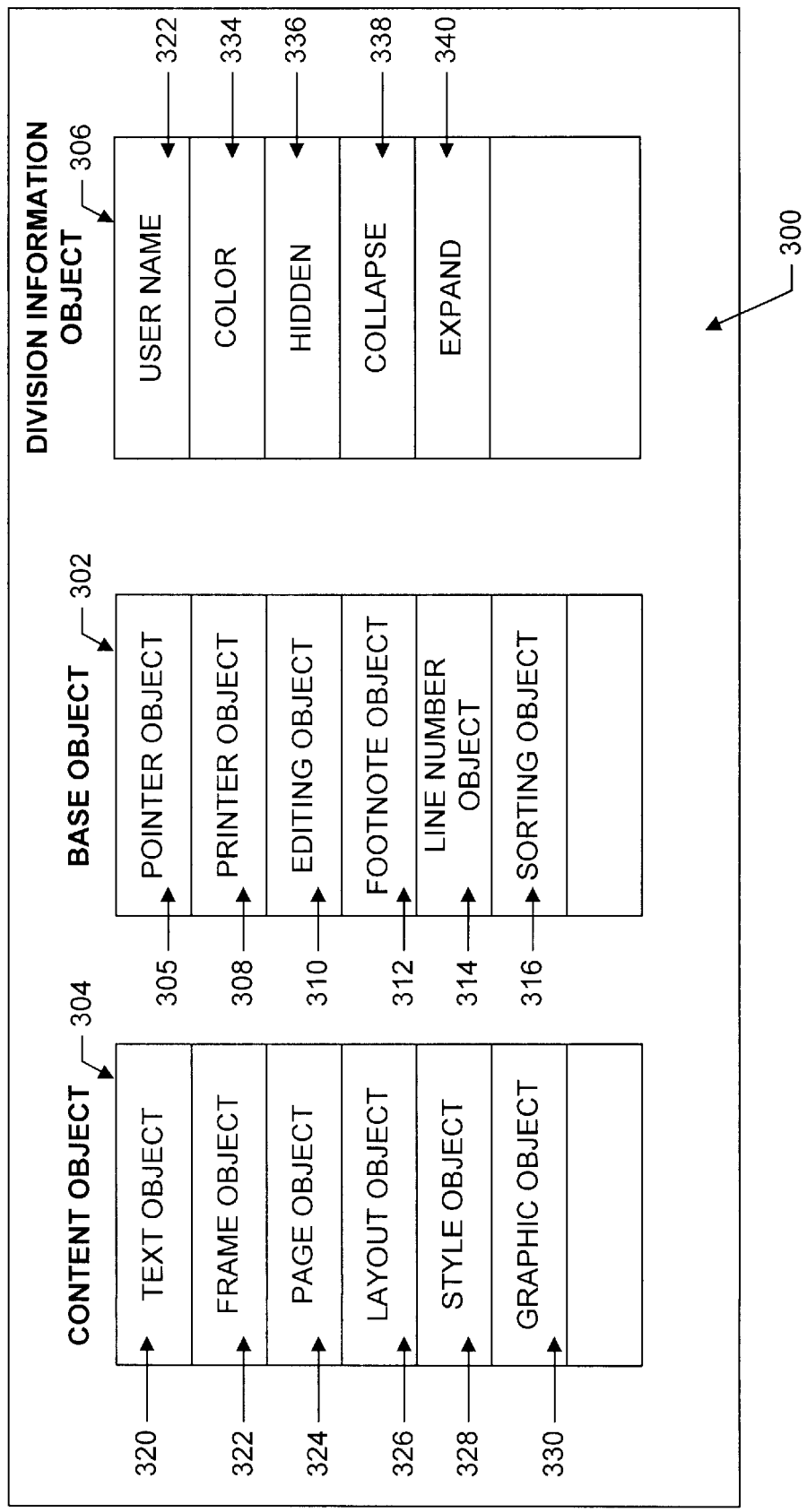
FIG. 3 illustrates schematically the structure of a base document object used in the inventive system.

FIG. 3 illustrates schematically the object structure of a document 300 capable of interacting with versioning tool 204 and word processing application 206. Specifically, document object 300 is instantiated from class CDocument and comprises a base object 302, a content object 304, and a division information object 306. All documents created with the inventive versioning tool comprise a hierarchical structure of parent and child documents, possibly in a nested configuration. All parent and child documents, in turn, are created from objects that, in turn, are instantiated from classes derived from the same class, CDocument, which serves as a fundamental class for constructing documents. The class CDocument, in turn, is a subclass of the base class CEngineObject. The class CEngineObject is the base class for all objects which interact with the word processing engine 205 and contains attributes and methods which allow the derived objects to directly interface with the engine.

Base object 302 comprises a series of other objects. In particular, base object 302 comprises the pointer object 305, a printer object 308, and editing object 310, a footnote object 312, a line number object 314, and a sorting object 316. It will be obvious to those reasonably skilled in the arts that, except for pointer object 305, other objects may be added to or deleted from base object 302 depending on the exact implementation.

Printer object 308 contains data members used in the printing of document object 300, and contains methods for manipulating these data members. Editing object 310 contains data members used to control editing of document object 300, in particular, its attributes include the identities of authors on a system and which of those authors have editing rights. Editing object 310 also contains methods for manipulating author data. Footnote object 312 contains data members and methods used in implementing footnotes within document object 300. Line number object 314 contains data members and methods used in the implementation of line numbers within document object 300. Sorting object 316 contains data members and methods for the sorting of object document 300.

Content object 304 contains member objects whose attributes, in turn, define the formatting and display of the data content of the document. Specifically, content object 304 comprises a text object 320, a frame object 322, a page object 324, a layout object 326, a style object 328, and a graphic object 330.

Further, in addition to base object 302 and content object 304, document object 300 comprises a division information object 306 containing attributes related to a particular division of a master document. Specifically, division information object 306 comprises user name attribute 332, color attribute 334, hidden object attribute 336, collapse attribute 338, and expand attribute 340.

Base object 302 also contains a pointer object 305. As previously mentioned, a document comprises a hierarchy of interconnected series of objects and the document object is the root of this hierarchy. Accordingly, the pointer object 305 contains a pointer which points to the first object which comprises the document.

Figure 4:
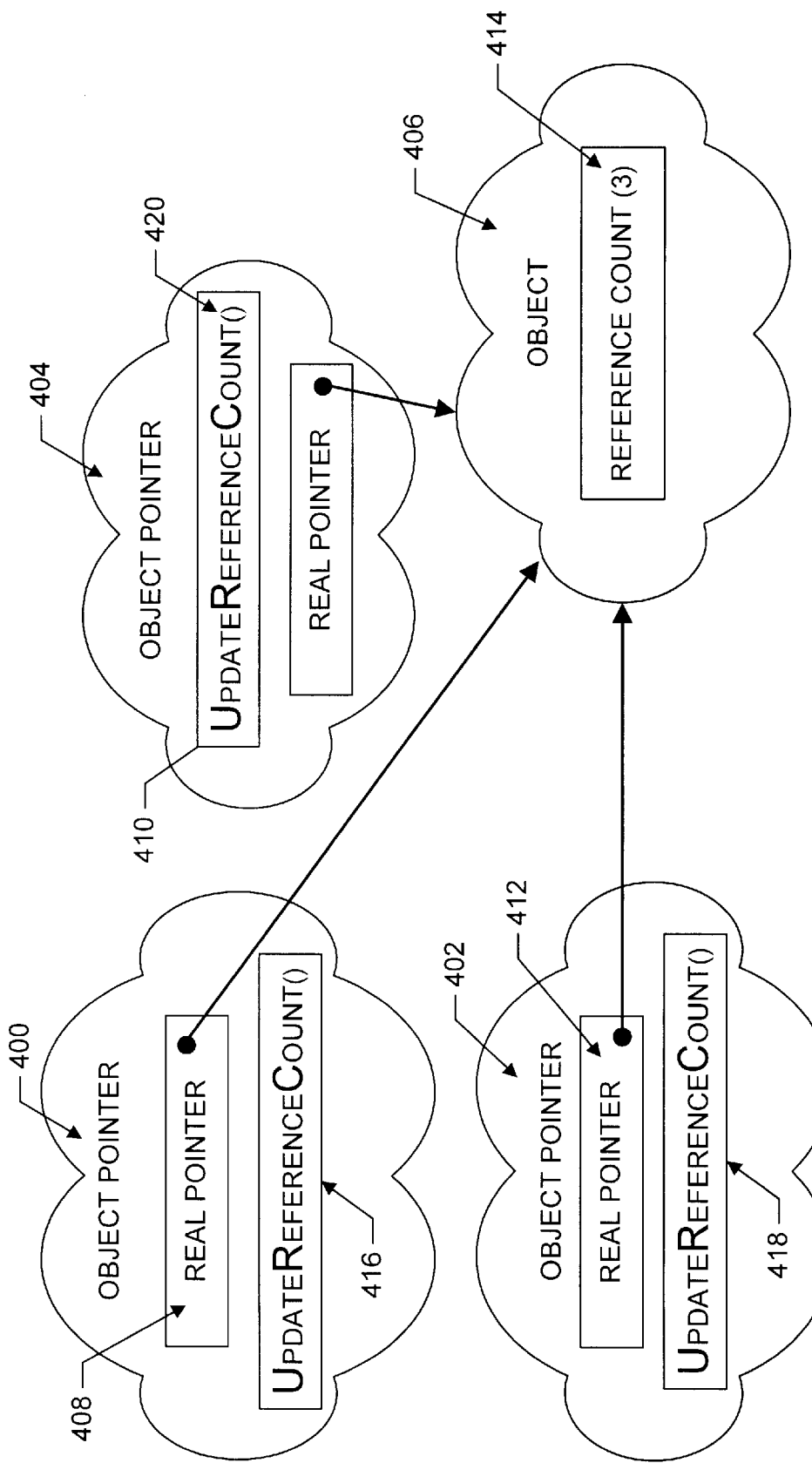
FIG. 4 illustrates in a block schematic manner the use of object pointers to reference an object.

However, in accordance with the principles of the invention, pointer 305 does not point directly to the object, but instead points to a substitute object called a demand loader object which is associated with the object and which will be discussed further below. Object pointers are schematically illustrated in FIG. 4. An object pointer is an object that holds a real pointer. For example, object pointer 400 holds pointer 408 as an attribute. Through operator overloading, object pointer 400 is caused to behave like the real pointer 408. However, object pointer 400 also has additional attributes and methods. For example, each demand loader object, for example, object 406, that comprises part of a document has a reference count 414 associated with it. The reference count 414 holds a count equal to the number of other object pointers that currently point to the demand loader object. As illustrated in FIG. 4, three pointers 408, 410 and 412 in object pointer objects 400, 404 and 402, respectively, point to object 406. Thus, the reference count 414 holds the number "3" When this number is decremented to zero, indicating that the object is no longer referenced by any other objects, the object is automatically deleted. Each object pointer has methods which maintain the reference count in its associated object. Object pointers 400, 402 and 404 have UpdateReferenceCount0 methods 416, 418 and 420 which update the reference count 414 associated with object 406. If one of object pointers 400–404 is deleted, it decrements the reference count associated with object 406 before it destroys itself.

Figure 5:
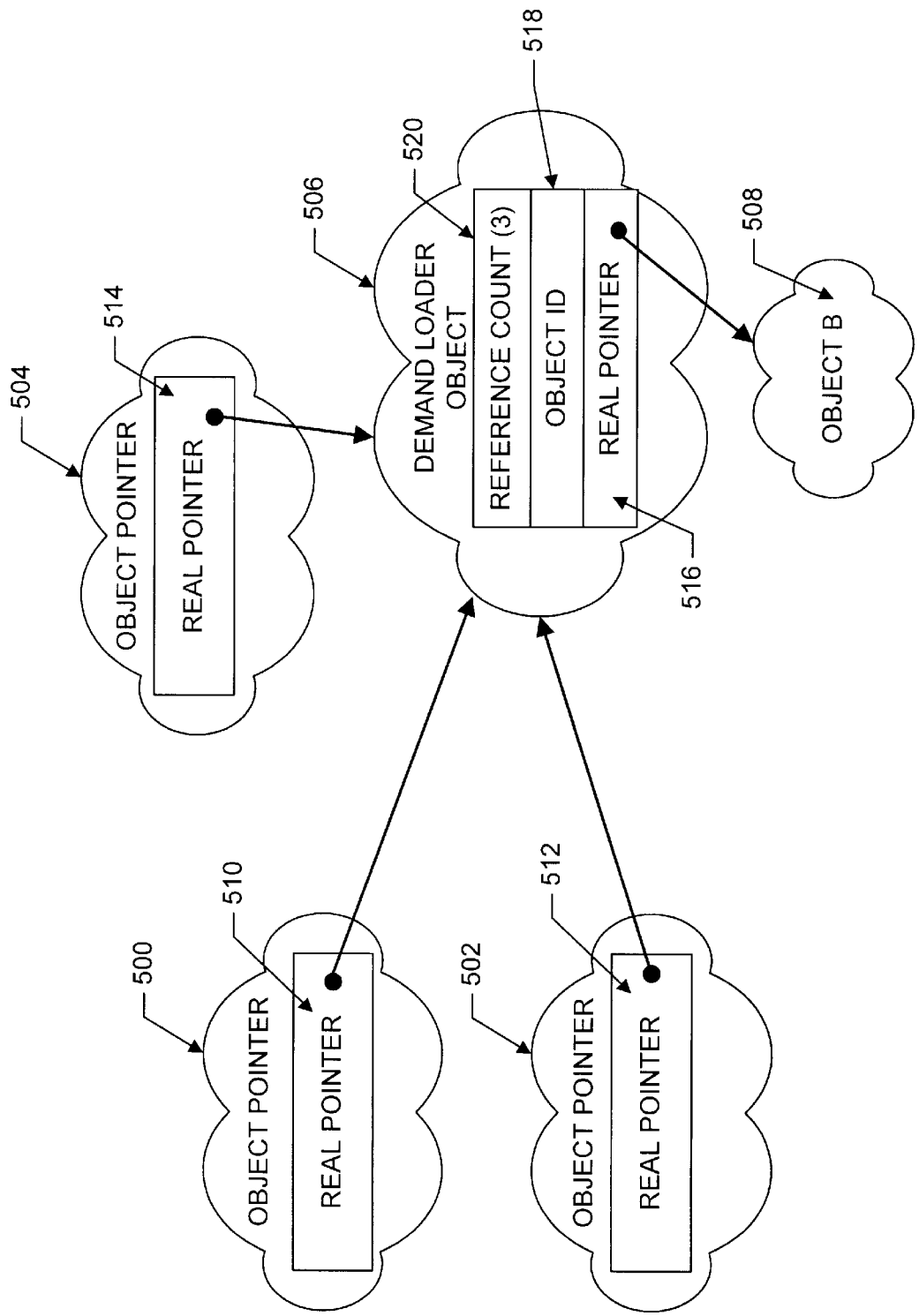
FIG. 5 illustrates in a block schematic manner the construction of a demand loader object.

Demand loader objects, such as object 406, are schematically illustrated in FIG. 5 and manage the storage of an associated document object in non-volatile storage. As previously mentioned, a document in memory consists of a network of document objects that are interconnected through object pointers and the "root" of this network is the CDocument object. Each of the document objects encapsulates part of the document such as a portion of the document text or embedded graphic frames, etc. Therefore, the document is broken down into discrete units. The "granularity" of these units is based on the smallest amount of information which can be included in each document object. For text documents, the smallest unit is a paragraph.

Document objects can be interconnected by object pointer objects. An object pointer object can be included as a member object in a first document object in order to point to, and interconnect, the first document object to a demand loader object which, in turn, points to a second document object.

When the network of document objects is stored in non-volatile storage, the object pointers are "virtualized" or converted to a form that is meaningful in the non-volatile storage format. For example, during the storage process, the real pointer value may be replaced by an object ID of the object to which it points. This object ID may also be the key used in an index which can be used to retrieve the object from the non-volatile storage into the memory.

Conversely, when an object, A, containing a reference to another object, B, is retrieved from non-volatile storage, the reference to object B must also be set up. One way to set up this reference would be to immediately retrieve object B and then set the pointer value in object A to point to object B. However, since the document consists of a network of objects, in many cases, object B contains references to other objects, and, accordingly, these other objects, and those objects to which they refer, would also have to be retrieved. The result is that, in most cases, the entire document file would be loaded when only a few objects are accessed. This is not desirable because it greatly slows the operation of the word processing system.

In order to overcome this problem, a substitute demand loader object (CDemandLoader) is created which contains a pointer to object B if object B is in memory and an object ID of object B, if object B is in storage, so that object B can be retrieved from non-volatile storage later. As other objects that reference object B are loaded, their pointers are set to point to the demand loader object, not the object itself.

This relationship is illustrated in FIG. 5. Three object pointer objects 500, 502 and 504 contain three real pointers, 510, 512 and 514, respectively, which pointers reference object B (508). As described, the real pointers 510, 512 and 514 actually reference a demand loader object 506. The demand loader object 506, in turn, contains a pointer 516 which points to object B, 508, and also an object ID 518 which can be used to retrieve object 508 if it is in storage. The demand loader object 506 also holds the reference count attribute 520 which is mentioned in regard to FIG. 4 and contains methods for loading the associated object into memory.

Therefore, the process of retrieving a document from disk creates the demand loader objects. Specifically, when an object is retrieved from non-volatile storage, the object is examined for member objects that are object pointers. If object pointers are found, the object IDs that are in the "virtualized" object pointers are used to create a demand loader. The pointers in the object pointer are then changed to point to the demand loader.

Only if an actual access to object B is attempted would the demand loader object actually retrieve object B from storage. The demand loader retrieves the object by calling a function in the loader/linker 212 (FIG. 2). The loader/linker then accesses the non-volatile storage and retrieves the object returning a pointer to the object. This pointer is then stored in the demand loader object. Even when object B, 508, is finally retrieved, it cannot be used to replace the demand loader object 506. In order to do this, all pointers that pointed to the demand loader object 506 would need to be identified so that they could be modified to point to the real object B, 508. Therefore, even after object B is loaded, it must be indirectly accessed, via demand loader object 506, and the double indirection of two pointers.

When an object referenced by a demand loader is finally brought into memory, it is then examined for member objects which are object pointers and demand loader objects are created for each of these latter pointers.

Figure 7:
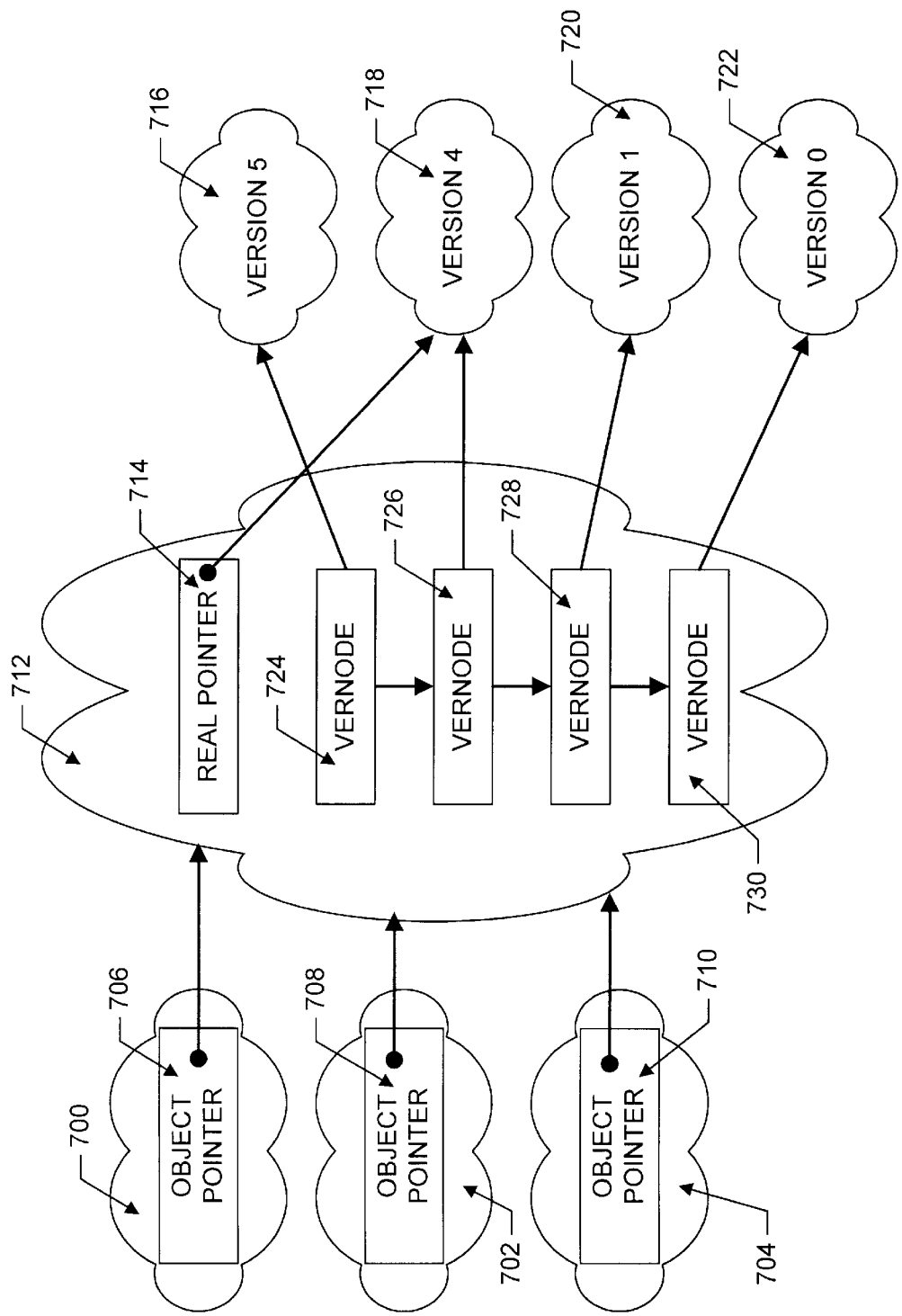
FIG. 7 is a block schematic diagram of the internal construction of a demand loader object which illustrates a version pointer list.

In accordance with the principles of the present invention, versioning can be provided by "sharing" document objects between versions and using demand loader objects to manage the shared objects. FIG. 7 illustrates the sharing of objects between different versions of the same document. Since versioning is done on an object basis, several versions of the same document can coexist in memory or in a single file without consuming large amounts of storage for duplicate objects because common data is shared among the versions and only objects that change from version to version are duplicated.

Specifically, when a new version is created it "inherits" all the objects from the previous version. However, the objects are not copied, but are shared instead. Then, as changes are made to the new version, objects that need to be changed are first duplicated and then modified. Each version will then consist of the collection of objects that were modified or created while that version was in effect plus other objects that are part of the previous version.

Figure 6:
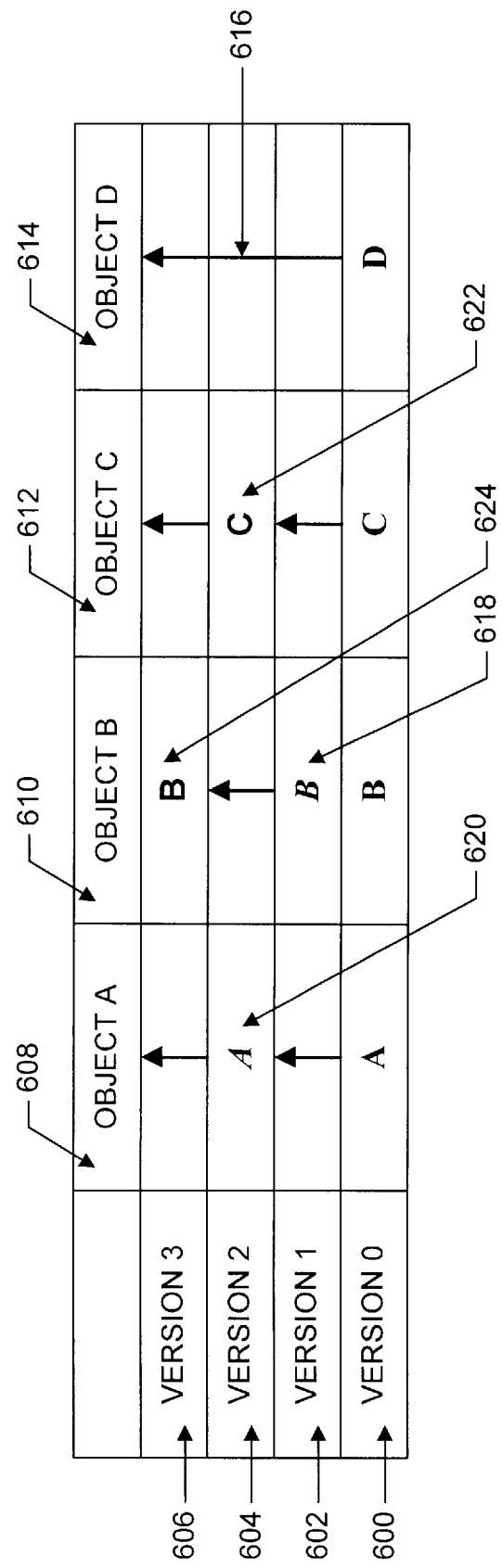
FIG. 6 is a schematic illustration of multiple versions of documents which share objects.

This arrangement is illustrated in FIG. 6 which is a table representing four versions of the same document, shown as lines 600, 602, 604 and 606 with the newest version (version 3) located on top. The document consists of four objects: object A, object B, object C, and object D (608, 610, 612 and 614, respectively) which are illustrated as the table columns.

In the first version, all object 608, 610, 612 and 614 are present as illustrated in line 600. Each version inherits from the previous version or versions, so each of versions 1, 2, and 3 (lines 602, 604 and 606) inherit object D from version 0 (line 600) as indicated by arrow 616. Arrow 616 indicates object D, 614, did not change in any of the versions.

Version 1 (line 602) inherits objects A, C, and D (608, 612 and 614) from version 0 (line 600), but has its own copy 618 of object B, 610. This copy 618 indicates that object B (610) was modified in version 1 (line 602) of the document. Version 2 (line 604) inherits object D (614) from version 0 (line 600) and object B (610) from version 1 (line 602), but has its own copy (620) of object A (608) and its own copy (622) of object C (612) indicating that these latter objects were changed in version 2 (line 604).

Similarly, version 3 (line 606) inherits object D (614) from version 0 (line 600) and object A (608) and object C (612) from version 2 (line 604), but has its own copy (624) of object B (610) indicating that object B was changed in version 3 (606).

Therefore, version 3 consists of copy 620 of object A, copy 624 of object B, copy 622 of object C and original object D, 614. Other versions can be constructed from appropriate objects and copies in a similar manner.

The versioning arrangement illustrated in FIG. 6 can be implemented by means of the object pointer and demand loader object arrangement discussed above. First, all version copies of the same object are identified by storing a list of pointers to different object versions in the demand loader for that object. Since there is only one demand loader for all versions of the object and any object pointer that points to the object actually points to the demand loader, there is no question about which version of the object is part of the current document version. This arrangement is illustrated in FIG. 7.

In FIG. 7, three object pointers 700, 702 and 704 contain pointers (706, 708 and 710, respectively) which point to a demand loader object 712. Demand loader object 712, in turn, contains a pointer 714 to an object version (if the object version is in memory, otherwise, demand loader 712 contains the object ID of the object version in storage). In FIG. 7, the pointer 714 points to object version 4 (718). This indicates that the last access to object 4 (represented by object versions 716–722) occurred when the document version 4 was the active version.

In accordance with the principles of the present invention, if an attempt is made to access an object through an object pointer and indirectly, through the demand loader object, the demand loader checks to see if the version of the object it is currently pointing at is the active version. It does this by comparing the object version number (or some other identifying information) with the document version number. For example, if object pointer 700 attempts to access the object to which demand loader object 712 points, demand loader object 712 checks to see whether object version 4 (718) is the current version.

If the object version 718 referenced by the demand loader object 712 is the current object version, the access is continued. However, if the demand loader 712 is not currently pointing to active version of the object, (for example if the document version changes to version 5) then the demand loader object 712 searches through an internal list containing pointers (724–730) to the existing versions of the object (716-722) looking for an object version that is the active version. If there isn't an object version corresponding to the active document version, then the object has inherited the object version from a previous document version. In this case the demand loader 712 searches for the most recent previous object version before the active version. In particular, the pointer list of pointers 724–730 can be arranged as a linked, ordered list to assist this search. The demand loader object 712 then transfers the located pointer to its pointer attribute 714 so that it points at this located version and allows the access to continue. Therefore each access to an object will actually access the correct version of the object due to the action of the demand loader.

Each node of the version pointer list contains an object version ID, which, in a preferred embodiment is the same as the document version ID and a pointer to the version copy. This list is created when the document object is loaded. In particular, each of the version copies is stored on the non-volatile storage sequentially. When information is retrieved from the non-volatile storage to create the demand loader object, information is also retrieved to create the version list.

In order to insure that the inventive versioning technique operates properly, it is necessary to insure that a copy is made of each object before the object is changed. Consequently, each object must be able to detect when it is about to be changed and to determine if the existing version of the object is current. If the existing version is not current, the object must create a copy of itself before the change is allowed to take place.

In accordance with object-oriented programming techniques, the data represented by the object is encapsulated so that it can only be changed using methods or member functions of the object. The object then must be structured so that any time one of these methods is called, the object checks to determine whether it is the current version. In a preferred embodiment, checking the existing version is performed by a common method in the base class CEngineObject called CheckVersiono. This method takes no parameters and has no return value. When CheckVersiono is called, it compares the present version of the object to the current document version. If a new version of the object needs to be created, the CheckVersiono method creates it and returns. Otherwise the CheckVersiono method simply returns. Therefore, each method in an object that changes a data member should call CheckVersion( ) before the data is changed. Since all objects descend from the base class CEngineObject, they will all have access to the public function, CheckVersiono, via inheritance.

The following code fragments (declaration and implementation) illustrates how the base class method CheckVersiono is called by a data modifying member function, SetDataMember( ) in the object CExampleObject, which member function modifies a private data member cDataMember. It is assumed that the parent class CMyBaseClass derives, either directly or indirectly, from the CEngineObject class:

```
class CExampleObject: public CMyBaseClass
{
public:
    inline void SetDataMember (lushort value);
    .
    .
    .
private:
    lushort cDataMember;
    .
    .
    .
}
inline void CExampleObject::SetDataMember (lushort value)
{
    CheckVersion();      // call CengineObject method to check
                         // if we need a new version before the data
                         // member is changed. A New
                         // version will be created, if
                         // necessary
    cDataMember = value;
}
```

As previously mentioned, the base method, CheckVersiono, will determine if the existing version of the object is current by comparing the object version to the current document version. If the object version is not current, the CheckVersiono method will call a NewVersiono method in the object. For example, sample code for the NewVersiono method might look like the following code fragment for the above-mentioned object, CExampleObject:

```
void CExampleObject::NewVersion (void)
{
    new CExampleObject (this)
}
```

The purpose of NewVersiono method is to create a copy of the existing object (identified by the *this pointer) by calling a special copy constructor which is discussed below. This "new" object copy then becomes the "old" version of the object while the existing object (*this) becomes the "new" version. Since the existing object is the "new" version, upon return from the CheckVersiono method, the same modification operations can be performed whether a "new" version was created or not. Therefore, it is not necessary to check whether the CheckVersiono method created a new version or not.

Each subclass of CEngineObject must declare and implement a "version constructor" which is a copy constructor that copies all members of the current object version. It has the form illustrated by the following code fragment:

```
CExampleObject::CExampleObject (CExampleObject *pOther)
        :CMyBaseClass ((CMyBaseClass *) pOther)
{
    cMember1 = pOther->cMember1;
    cMember2 = pOther->cMember2;
    .
    .
    .
}
```

This constructor constructs the "old" object version from the new object version to which the pointer Other points. In order to prevent an infinite recursion, the members must be modified directly without calling the CheckVersiono method first.

Member objects also present special cases. In particular, when a member object is modified, it is necessary not only to check and, possibly, create a new version copy for the object modified, but also the object in which the modified object is a member must be checked to insure its version is current. Unfortunately, due to the nature of object-oriented programming, the member object does not automatically have information which would indicate the identity of the containing object or even if it is a member of some object.

In accordance with a preferred embodiment, the member object is provided with information that indicates whether any objects contain it and identifies those objects. The identifying information for each object is stored in an attribute which is part of each object. This attribute is a CEngineObject pointer designated as *cWhole. When a member object is constructed in a containing object, the member object is passed a pointer to the containing object. The member object saves this pointer in the *cWhole attribute. Later, when the member object is about to be changed it calls the CheckVersion( ) method of the containing object via the stored pointer, cWhole>CheckVersion( ) to update the object version of the containing object.

This functionality has been encapsulated in an intermediate class, the CMember class. The CMember class has a constructor of the form CMember(CEngineObject*) and it has an inline CheckVersiono which will perform the method call cWhole>CheckVersion( ). Consequently, any subclasses derived from the CMember class will have the capability discussed above. The following code fragment is an example of a derivation of a subclass, CExampleMember, from the CMember class:

```
class CExampleMember:public CMember
{
public:
    CExampleMember (CEngineObject *pWhole);
    CExampleMember (CEngineObject *pWhole,
                                    CExampleMember *pOther);
    void SetData (lushort value);
    .
    .
private:
    lushort cMyData;
    .
    .
};
CExampleMember::CExampleMember (CEngineObject *pWhole)
            :CMember (pWhole)
{
    cMyData = 0;
    .
    .
}
CExampleMember::CExampleMember (CEngineObject *pWhole,
            CExampleMember *pOther)
            :CMember (pWhole)
{
    cMyData = pOther->cMyData;
    .
    .
}
void CExampleMember::SetData (lushort value)
        CheckVersion();      // call CMember::CheckVersion()
        cMyData = value;
}
```

The following code fragment is an example of a subclass, CExampleObject, that uses the CMember class:

```
class CExampleObject: public CMyBaseClass
{
```

-continued

```
    public:
            CExampleObject (void);
            CExampleObject (CExampleObject *pOther);
            .
            .
            .
    private:
            CExampleMember cExampleMember;
    };
```

The following code fragment illustrates that, when constructing the containing object, the address of the containing object must be passed to all member objects:

```
CExampleObject::CExampleObject (void)
    :cExampleMember (this)
{
    .
    .
    .
CExampleObject::CExampleObject (CExampleObject *pOther)
    :CmyBaseClass ((cMyBaseClass *) pOther),
    cExampleMember (this, &pOther->cExampleMember)
{
    .
    .
    .
}
```

Another special case occurs when an object derived from the CEngineObject class points to an object which is not derived from the CEngineObject class. This case is similar to that discussed above with member objects. In particular, if the non-CEngineObject must be changed, the CEngineObject must be checked for proper version. If a copy of the CEngineObject object must be made, a copy of the non-CEngineObject object should also be made. This can be handled by making the pointed-to object derive from the CMember class discussed above and constructing it with a pointer to the CEngineObject.

When the CEngineObject object is changed, a copy of the non-CEngineObject object must also be made. This is necessary because when one version of the CEngineObject object is deleted, there would be no way to tell if any other CEngineObject object versions were pointing to the non-CEngineObject, so there would no way to tell whether to delete the non-CEngineObject or not. However, this problem can be solved by reference counting the non-CEngineObject as discussed above.

Figure 8:
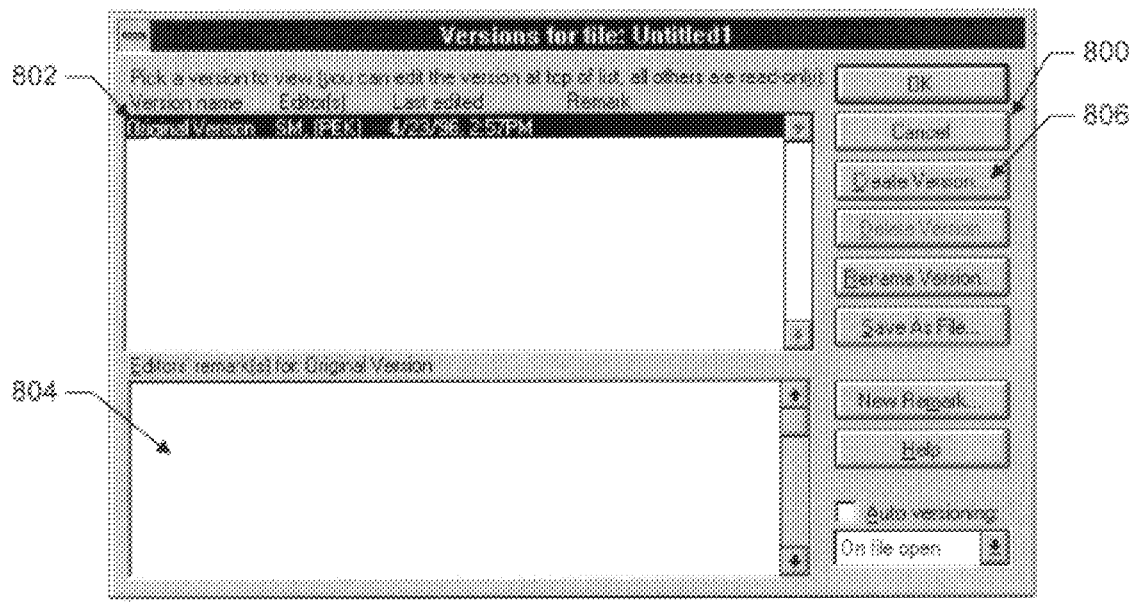
FIG. 8 is a diagram of a user interface dialog box which displays various document versions.
Figure 9:
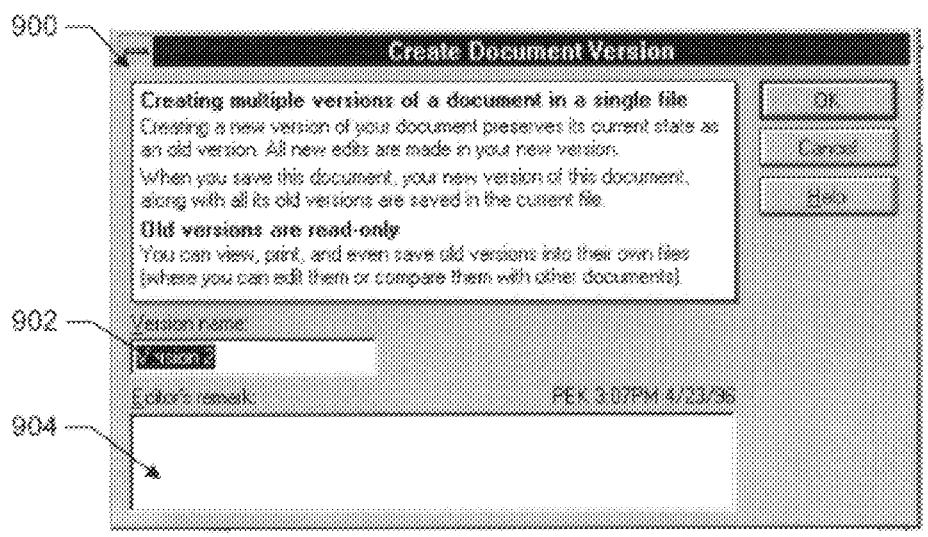
FIG. 9 is a diagram of a user interface dialog box which allows the creation of a new version.

FIG. 8 is an illustrative dialog box generated by the user interface software (214, FIG. 2) for displaying various versions of a document. The dialog box 800 has a scrolling listbox 802 which indicates each version present in a particular file. The listbox displays the version name, editors, last edit time and any remarks made by the editors. A further textbox area 804 is provided to enter additional remarks. A new version can be created by operating the "Create Version" button 806.

Operation of the create version button 806 causes the dialog box 900 to be displayed. This latter dialog box allows the user to enter a version name in editbox 902. This version name may be the name used internally to identify each version or the software may choose another name internally. A textbox area is also provided for additional comments.

Although only one embodiment of the invention has been disclosed, it will be apparent to those skilled in the art that various changes and modifications can be made which will achieve some of the advantages of the invention without departing from the spirit and scope of the invention. These and other obvious modifications are intended to be covered by the appended claims.

What is claimed is:

1. Apparatus for constructing a document from a plurality of objects in a computer system having a memory and a non-volatile storage, a document object being accessed whenever an invocation of one of the document object's methods or the manipulation of one of the document object's attributes is required, the apparatus comprising:

a demand loader object residing in the memory and associated with each of the plurality of objects, each of the demand loader objects including program logic for loading the associated object into the memory from the storage when the associated object is accessed; and object pointer objects residing in the memory and connecting two of the plurality of objects, each object pointer object being a member of a first one of the two objects and having a pointer therein pointing to a demand loader object associated with a second one of the two objects.

2. Apparatus according to claim 1 wherein each demand loader object further includes a reference count attribute having a reference count stored therein which reference count indicates the number of object pointers which point to the each demand loader object.

3. Apparatus according to claim 2 wherein each object pointer object includes program logic for updating a reference count attribute in a demand loader object to which the object pointer points.

4. Apparatus according to claim 1 wherein each demand loader object includes an object ID for locating an associated object in the non-volatile storage.

5. Apparatus according to claim 1 wherein each demand loader object further includes a pointer to an associated object.

6. Apparatus for use with a computer system having a memory and a non-volatile storage, the apparatus creating a new version of a document, which is composed of a plurality of objects which are interconnected by object pointers, a document object being accessed whenever an invocation of one of the document object's methods or the manipulation of one of the document object's attributes is required, in response to a user request to change one of the plurality of objects, and comprising:

a demand loader object residing in the memory and associated with the one object, the demand loader object including program logic for loading the one object into the memory from the storage when the one object is accessed;

means in the demand loader object for creating a list of object versions for the one object, the list including a version ID and a pointer to a copy of the one object for each object version; and means responsive to the request by making a copy of the one object and inserting a version ID and a pointer to the one object copy into the list.

7. Apparatus according to claim 6 wherein the new document version has a document version ID and the copying means is responsive to the request for inserting the document version ID into the list.

8. Apparatus according to claim 7 wherein the copying means is responsive to the request for checking the list to determine whether the document version ID is in the list.

9. Apparatus according to claim 8 wherein the means responsive to the request makes a copy of the one object and inserts the document version ID and a pointer to the one object copy into the list if the document version ID is not in the list.

10. Apparatus according to claim 7 wherein the demand loader object comprises an object ID for retrieving the one object from the storage into the memory.

11. Apparatus according to claim 7 wherein each of the object pointers comprises an object which includes a pointer that points to a demand loader object.

12. A method for constructing a document from a plurality of objects in a computer system having a memory and a non-volatile storage, a document object being accessed whenever an invocation of one of the document object's methods or the manipulation of one of the document object's attributes is required, the method comprising the steps of:

A. creating a demand loader object associated with each of the plurality of objects, each of the demand loader objects including program logic for loading the associated object into the memory from the storage when the associated object is accessed; and B. connecting two of the plurality of objects with object pointer objects, each object pointer object being a member of a first one of the two objects and having a pointer therein pointing to a demand loader object associated with a second one of the two objects.

13. The method according to claim 12 wherein step A comprises the step of:

A1. creating each demand loader object with a reference count attribute having a reference count stored therein which reference count indicates the number of object pointers which point to the each demand loader object.

14. The method according to claim 13 wherein step B comprises the step of:

B1. creating each object pointer object with program logic for updating a reference count attribute in a demand loader object to which the object pointer points.

15. The method according to claim 12 wherein step A further comprises the step of:

A2. creating each demand loader object with an object ID for locating an associated object in the non-volatile storage.

16. The method according to claim 12 wherein step A further comprises the step of:

A3. creating each demand loader object with a pointer to an associated object.

17. A method for use with a computer system having a memory and a non-volatile storage, the method creating a new version of a document, which is composed of a plurality of objects which are interconnected by object pointers, a document object being accessed whenever an invocation of one of the document object's methods or the manipulation of one of the document object's attributes is required, in response to a user request to change one of the plurality of objects, and comprising the steps of:

A. creating a demand loader object associated with the one object, the demand loader object including program logic for loading the one object into the memory from the storage when the one object is accessed;

B. creating a list of object versions for the one object, the list including a version ID and a pointer to a copy of the one object for each object version; and C. making a copy of the one object and inserting a version ID and a pointer to the one object copy into the list in response to the request.

18. The method according to claim 17 wherein the new document version has a document version ID and step C comprises the step of:

C1. inserting the document version ID into the list in response to the request.

19. The method according to claim 18 wherein step C further comprises the step of:

C2. checking the list to determine whether the document version ID is in the list in response to the request.

20. The method according to claim 19 wherein step C further comprises the step of:

C3. making a copy of the one object and inserting the document version ID and a pointer to the one object copy into the list if the document version ID is not in the list.

21. The method according to claim 17 wherein step A comprises the step of:

A1. creating a demand loader object with an object ID for retrieving the one object from the storage into the memory.

22. A computer program product for constructing a document from a plurality of objects in a computer system having a memory and a non-volatile storage, a document object being accessed whenever an invocation of one of the document object's methods or the manipulation of one of the document object's attributes is required, the computer program product comprising a computer usable medium having computer readable program code thereon, the computer program code including:

means for creating a demand loader object in the memory, the demand loader object being associated with each of the plurality of objects, each of the demand loader objects including program logic for loading the associated object into the memory from the storage when the associated object is accessed; and means for creating object pointer objects in the memory, each of the object pointer objects connecting two of the plurality of objects, each object pointer object being a member of a first one of the two objects and having a pointer therein pointing to a demand loader object associated with a second one of the two objects.

23. A computer program product for use with a computer system having a memory and a non-volatile storage, the computer program product creating a new version of a document, which is composed of a plurality of objects which are interconnected by object pointers, in response to a user request to change one of the plurality of objects, a document object being accessed whenever an invocation of one of the document object's methods or the manipulation of one of the document object's attributes is required, and comprising a computer usable medium having computer readable program code thereon, the computer readable program code including:

means for creating a demand loader object in the memory, the demand loader object being associated with the one object, the demand loader object including program logic for loading the one object into the memory from the storage when the one object is accessed;

means for creating in the demand loader object a list of object versions for the one object, the list including a version ID and a pointer to a copy of the one object for each object version; and means responsive to the request for making a copy of the one object and inserting a version ID and a pointer to the one object copy into the list.

* * * * *